United States Patent [19]

Speyer

[11] 4,132,685

[45] Jan. 2, 1979

[54] FILLED, THERMOPLASTIC WORKHOLDING COMPOSITION INCLUDING A DICARBOXYLIC ACID, AN ALKYLENE HYDROCARBON POLYMER, AND AN AROMATIC HYDROCARBON POLYMER

[75] Inventor: Fred B. Speyer, Euclid, Ohio

[73] Assignee: TRW Inc., Cleveland, Ohio

[21] Appl. No.: 838,481

[22] Filed: Oct. 3, 1977

[51] Int. Cl.$^2$ ............................................... C08L 1/28
[52] U.S. Cl. ................................ 260/17 R; 260/23 H
[58] Field of Search ............................ 260/17 R, 23 H

[56] References Cited

U.S. PATENT DOCUMENTS

| | | | |
|---|---|---|---|
| 2,394,101 | 2/1946 | Phillips et al. | 260/17 R |
| 2,458,486 | 1/1949 | Young | 260/17 R |

FOREIGN PATENT DOCUMENTS 147256  7/1952  Australia ............................... 260/17 R

OTHER PUBLICATIONS

Chem. Absts. 85:162103t, Coating Materials---Lanes, Iwata.

*Primary Examiner*—Edward M. Woodberry

[57] ABSTRACT

There is provided an improved thermoplastic hot-melt composition for use in encapsulating a workpiece, e.g. a jet engine airfoil or blade. The composition comprises a filled, normally solid resinous material which contains as an organic moiety, a blend of a dimeric fatty acid containing from 32 to 40 carbon atoms, a $C_5$–$C_6$ alkylene hydrocarbon polymer, and a nonpolar aromatic hydrocarbon polymer, said blend having dispersed therein a minor amount of an alkyl cellulose ether. A method of encapsulating a workpiece with such a composition is also disclosed.

13 Claims, No Drawings

FILLED, THERMOPLASTIC WORKHOLDING COMPOSITION INCLUDING A DICARBOXYLIC ACID, AN ALKYLENE HYDROCARBON POLYMER, AND AN AROMATIC HYDROCARBON POLYMER

RELATED APPLICATION

This application is related to my concurrently filed application Ser. No. 838,488.

BACKGROUND OF THE INVENTION AND PRIOR ART

Much of the prior art of matrix fixturing centers on the use of low melting metallic alloys having controlled shrinkage characteristics. In this connection reference may be had to U.S. Pat. Nos. 3,790,152 and 3,982,430. These materials provide a matrix for holding a wide range of metal parts for drilling, grinding, lapping, milling and turning operations. Certain metallic alloys in which bismuth or antimony are incorporated give molten metal alloys which expand upon solidification thus providing excellent duplication and reproduction. There are, however, many commercial operations where these metallic alloys do not provide optimum results. The weight of these alloys when used in conjunction with large parts poses a processing problem; their high cost makes for an expensive inventory problem, and the loss of any of the alloy during processing is a serious economic disadvantage. Contamination caused by metal such as bismuth, cadmium, lead and tin contained in such materials is extremely damaging in the encapsulating of jet engine parts, for example.

One of the major obstacles to wider utilization of thin wall, odd-shaped, fragile and nonmagnetic parts has been the relatively inflexible method by which they are mechanically encapsulated for machining. Production difficulties in supporting these parts are caused by vibration and chatter, distortion, fracturing, deflection, interrupted cuts, rapid consumption of cutting tools, heavy burring, high scrap rate and secondary repairs. Typical material requirements for jet engine blade staging are as follows:

(1) The material should have the rigidity of lead at room temperature or below.
(2) The material should be injectable and have a set up time of about 2–3 minutes.
(3) The material should have minimum shrinkage and not be appreciably soluble in machining coolants.
(4) The material should be easily removable from machined parts in such a manner as not to damage the parts. Any residual material should not attack the parts or workpieces or coatings thereon at temperatures as high as 2000° F.
(5) The material should be nontoxic, nonflammable and relatively odorless.
(6) The material should be relatively inexpensive and reusable.
(7) The material should have good shelf life and a pot life at application temperature.

Encapsulating a workpiece is different from "potting" a workpiece. In the former, the entire workpiece is enclosed by a resinous composition. In the present invention, this is done by injection molding the resinous composition at an elevated temperature into a closed mold cavity in which the workpiece is precisely positioned. After cooling the mold, the workpiece and its entirely surrounding hardened resinous composition is withdrawn from the mold and submitted to a machining operation. As the workpiece is machined, part of the encapsulating compound is machined away from the workpiece. In the case of potting, the workpiece is first accurately located in a matrix box with both ends of the workpiece projecting out of the box. The compound is then poured into the box and solidified with one or both ends of the workpiece remaining exposed. One or both ends of the workpiece may then be submitted to a metal forming or shaping operation without the tool engaging the potting compound.

Because of the difference between potting and encapsulating, different compositions are utilized. The encapsulating composition must be stronger in order to withstand the load forces applied directly to the encapsulating compound.

Heretofore, organic compositions have been used as workholding compositions. For example, reference may be had to the patent to Lapac et al, U.S. Pat. No. 3,897,535. This patent discloses a process for fixturing a workpiece including disposing a liquid organic resin work holding material within the work holder around the workpiece and quenching the assembly at between 40° F. and 73° F. to solidify the work holding material. The cold quench within this particular temperature range gives improved holding strength and reduces shrinkage of the organic work holding material. According to the Lapac process, ceramic stones are heated and disposed within the work holder to heat the work holder and the workpiece prior to pouring the work holding composition into the work holder. The stones further increase the holding strength of the work holding material and reduce shrinkage even more. Glass balls may be used in place of ceramic stones. These materials are, however, of substantial diameter, preferably between one-eighth and two-tenths of an inch in diameter. Smaller sized balls do not permit proper flow of wax into the work holding cavity. Stones or balls of a greater size while they may perform satisfactorily in heating the workpiece do not add much strength to the solidified composition. The organic resin material according to Lapac may be any wax or thermoplastic which is solid at room temperature.

Other references of interest in this field include Speyer U.S. Pat. Nos. 3,921,343; 3,748,155 and 3,854,962; Shepard 3,586,559 and McCormick 3,319,289.

The present invention is an improvement in the use of organic materials for fixturing workpieces, particularly encapsulating workpieces. Because of the composition and the process of the present invention utilized herein, the operations of separately filling a work holder cavity with the ceramic stones or glass balls followed by pouring or injecting a molten composition thereover is avoided. Moreover, the necessity for recovering the glass balls or ceramic stones is obviated thereby reducing the number of operations and the attendant cost of recovery of materials. The problems of handling of very hot (800° F.) stones are avoided. The compositions of the present invention have all of the desired properties for encapsulating of devices such as jet engine blades while achieving these objectives in a more economical and useful manner. The filler material does not need to be removed from the composition in order that the composition may be properly reused. The compositions hereof have excellent shelf life, and even when molten undergo minimum settling of the inorganic moiety.

BRIEF STATEMENT OF THE INVENTION

Briefly stated, the present invention is in a resinous thermoplastic hot melt composition composed of an organic moiety and an inorganic moiety. The organic moiety is composed of hydrocarbon polymers, preferably a mixture of an alkylene hydrocarbon polymer, e.g. a polyterpene; and an aromatic hydrocarbon polymer. A plasticizer, for example a high molecular weight unsaturated fatty acid such as dilinoleic acid may be advantageously present. For particular utility as an encapsulating composition, these compounds must also contain an alkyl ether of cellulose such as cellulose methyl ether, or cellulose ethyl ether. The inorganic moiety is preferably a finely divided inorganic filler, for example, a ceramic oxide such as aluminum oxide which is intimately dispersed in the organic moiety. The inorganic filler material is present in the range of from 5–70 parts per 100 parts of the encapsulating composition and preferably from 50–70 parts per 100 parts of the composition.

The present composition also contemplates a method of encapsulating a workpiece in a closed mold by injection molding about the workpiece supported within the mold, the foregoing filled resinous thermoplastic hot melt composition at an elevated temperature, and cooling the assembly to about room temperature. Conventional injection molding apparatus is used in the encapsulating operation. Material is supplied under pressure to the mold from a molten supply of encapsulating composition. The temperature of the melt is from about 250° F. to 300° F. (120°–150° C.), preferably about 275° F. After cooling, the encapsulated part is removed from the mold and mechanically operated upon as indicated above. The filled resinous material may then be recovered simply by elevating the temperature of the encapsulated machined article to a point where the filled resinous material again becomes fluid and removing the workpiece therefrom. The retrieved workpiece is carefully washed and the filled organic resinous encapsulating composition then recovered and reused indefinitely. The composition is stable, nonreactive with the workpiece and easily removed therefrom without introducing contaminants of a deleterious nature. Common hydrocarbon solvents may be used to clean the workpiece after machining.

DETAILED DESCRIPTION AND SPECIFIC EXAMPLES

The Encapsulating Composition

The encapsulating compositions hereof are composed of an organic resinous moiety and an inorganic moiety. The inorganic moiety is inert to the organic moiety and the workpiece, and serves as a reinforcing agent and as a heat conduction improving agent. It is present in these compositions as a finely divided material. Any finely divided inert inorganic filler material may be used in the potting compositions of this invention. It is used in an amount not to exceed its critical pigment-volume concentration in a given organic moiety as described below. There are, of course, thousands of inorganic filler materials which are useful herein and no purpose is served by attempting to identify all of them by name. However, a few illustrative specific classes and examples of inorganic filler materials useful herein include, metal oxides such as aluminum oxide, zirconium oxide, beryllium oxide, titanium dioxide, molybdenum dioxide, silicon dioxide, iron oxide, barium oxide, calcium oxide, magnesium oxide; carbonates such as calcium carbonate, magnesium carbonate, barium carbonate; sulfates such as magnesium sulfate, barium sulfate, calcium sulfate; silicates such as calcium silicate, hydrous aluminum silicate, magnesium silicate; asbestos powder, glass fibers, etc; metallic powders, e.g. aluminum, iron, steel, copper, etc; clays, such as fuller's earth, china clay, attapulgus clay etc. Mixtures of two more more fillers may be used if desired. The nature of the workpiece and its susceptibility to contamination will dictate the kind of inorganic filler used. Aluminum oxide, for example, is particularly satisfactory for use in encapsulating jet engine blades.

The inorganic filler has three main purposes in these compositions, i.e., to reduce cool down time for removal of the encapsulated part from the mold apparatus for further cooling, to reduce cost by diluting the more costly organic moiety, and to minimize shrinkage of the resin. Preferred inorganic fillers are finely divided ceramic oxides, e.g., aluminum oxide, beryllia, zirconia, calcium carbonate, etc.

The inorganic moiety of the composition hereof constitutes broadly from 5% to 70% by weight of the entire composition, the balance being the above-mentioned organic moiety. The amount of the inorganic moiety is, however, insufficient to exceed the critical pigment volumen concentration of the system on a volume basis.

By "finely divided" as used herein is meant having a particle size such that at least 95% of the material will pass through a 200 mesh U.S. Standard Screen series sieve. In general, particle sizes and distribution characteristics of coating composition pigments are applicable in the present compositions. A particle size of 95% —325 mesh is typical of a useful and preferred particle dimension.

The upper limit of concentration of the powdered filler is critical to the integrity of the work holding material. Above a certain amount by volume, there appears to be too little of the resinous material to adequately bind the inorganic filler. As excessive amounts of such filler are added, the mass becomes weaker and thus progressively less useful as an encapsulating compound. There appears to be a critical filler to binder volume ratio which cannot be exceeded not at all unlike the critical pigment-volume concentration (CPVC) known in paint technology for pigments dispersed in a drying oil vehicle. This CPVC ratio is dependent upon a number of factors including the nature of the resin, the particle size of the filler, and the crystalline form of the filler, etc. Reference may be had to the paper by Van Loo delivered at the Mattiello Lecture in 1956 and published in the December 1956 issue of the Official Digest of Paint and Varnish Clubs and entitled "Physical Chemistry of Paint Coatings, a Constant Search — Critical Pigment Volume Concentration". See also Asbeck et al, I. & E. Chem. vol. 41, page 1470, 1949 and U.S. Pat. No. 2,751,782. The "CPVC" is readily determined for each inorganic filler moiety in each organic moiety and will in each case be different. The CPVC is critical, finite and must not be exceeded in these compositions.

The lower limit of concentration of the filler is not critical, although at least 5% by weight thereof is required before any advantage in quench time and in shrinkage characteristic is realized. Best results are secured when the weight % of the inorganic filler is in the range of 50% to 70% of the entire composition for inorganic fillers having a density of 2 to 6. This corresponds to a volume ratio of filler to resin in the range of 20% to about 40% for materials such as aluminum oxide.

The organic moiety is a thermoplastic hot melt organic resinous portion of the present compositions. It is a normally solid material which is preferably mainly of polymeric hydrocarbon derivation. The polymer, or mixture of polymers, is nonpolar and preferably has a softening point of about 200° F. (93° C.).

Best results are secured when the hydrocarbon polymer portion of the resinous composition is formed from a mixture of two polymeric hydrocarbon materials, one of which is aliphatic in origin and the other of which is aromatic and petroleum in origin.

A particularly satisfactory class of aliphatic hydrocarbon polymers includes those polymers which are formed from mono- and poly- unsaturated $C_5$–$C_6$ hydrocarbons which condense to a terpene structure. An especially satisfactory example is a copolymer of 2-methyl-2-butene and 1,3-pentadiene. A commercial product of this class is an inter-polymerization product of alkylene hydrocarbons having substantially the following analysis and marketed under the mark "Wingtack":

| Materials | Percent by Weight |
|---|---|
| 2-pentene | 4.8% |
| 2-methyl-2-butene | 42.2% |
| Isoprene | 2.5% |
| 1,3-pentadiene | 42.4% |
| 2,3-dimethyl-1-butene | 2.3% |
| Unsaturated $C_5$–$C_6$ hydrocarbons | 5.5% |

The presence of such an aliphatic hydrocarbon resin is desired to enhance cohesion within the thermoplastic hot melt composition body itself. The broad range for the polymeric aliphatic hydrocarbon resin content in the present composition is from about 10 to about 20 parts by weight. These $C_5$–$C_6$ alkylene hydrocarbon polymers are nonpolar and tacky, have a molecular weight of from about 1000 to 1400, and have a softening point by the well known ring and ball method of from about 95° to 120° F. These materials are also known as polyterpenes. They have excellent heat stability, a low acid number (less than 1.0) and a very low ash content (0.1% max.). Such a material may be used as the sole polymeric ingredient in some cases.

A second polymeric material has been found to be particularly useful in the compositions of the present invention. It is a polymer derived from petroleum derivatives which are also hydrocarbons. These hydrocarbons are predominantly aromatic in nature, and include a variety of alkylene substituted phenyl and naphthyl rings. These aromatic hydrocarbon resins are formed by known catalytic polymerization procedures and, for the purposes of this invention, are desirably those which have a softening point of from 98° to 115° C. as determined by the well known ring and ball method. Usually these resins are obtained commercially as solid flake materials. The viscosity of the material at 25° C. as a 70% solution in toluene is Gardner-Holdt R-U. Such material is commercially available under the trademark "Picco-6100." Usually from 10–20 parts by weight of this ingredient are used. When combined with the aliphatic hydrocarbon polymer ingredient, generally equal amounts of each by weight are employed.

The properties of the polymeric material are enhanced by the inclusion therein of a high molecular weight organic carboxylic acid component, preferably a dimeric unsaturated fatty acid, such as dilinoleic acid. These acids are commercially available as "dimer acids" and usually contain a total of from 32–40 carbon atoms and result from the dimerization of polyunsaturated fatty acids containing from 16–20 carbon atoms and identified herein, for example, as "$C_{16}$–$C_{18}$ dimer acids" a commercial dimerization product of mixed $C_{16}$–$C_{18}$ polyunsaturated fatty acids. These materials when admixed in the compositions of the present invention improve the adhesion, and cohesion, and render the compositions less friable at normal temperatures. 5–20 parts by weight of the "dimer acid" component are used.

A further essential ingredient of the encapsulating compositions of the present invention is a lower alkyl ($C_1$–$C_3$) ether of cellulose, e.g. methyl cellulose, ethyl cellulose, propyl cellulose, isopropyl cellulose, or the like. This ingredient improves the characteristics of the encapsulating composition for purposes of injection molding.

The cellulose ether component is usually present in amounts ranging from about 2.5 parts to 8 parts by weight, preferably 4 parts to 5 parts by weight. In addition to the alkyl cellulose ether, there is desirably also present one or more $C_{10}$–$C_{20}$ monocarboxylic saturated fatty acids such as decanoic acid, lauric acid, myristic acid, stearic acid, palmitic acid, or arachidic acid, and/or a $C_{10}$–$C_{20}$ unsaturated monobasic carboxylic acid such as oleic acid or linoleic acid eleostearic acid, gadoleic acid, etc. in an amount ranging from 2 parts to 5 parts by weight. These acids serve as a solubilizer for the cellulose ether in the compositions hereof. Also, small amounts of less than 0.5 parts by weight conventional antioxidants may be found beneficial in these compositions, such as for example 0.1 part by weight of 4,4' methylene bis (2,6-ditert. butylphenol). In general, the "parts by weight" are based on 100 parts of the entire composition including both the inorganic and the organic moieties.

In composing the encapsulating compositions of the present invention, a preferred procedure involves separate addition of the organic ingredients at elevated temperatures and mechanical stirring in of the inorganic filler over a relatively long period of time. Thus, the dimer acid is generally heated and stirred in in a suitable cooking vessel at a temperature of about 250° F. (121° C.). A polyterpene is added and stirred in and the temperature raised to 300° F. (149° C.). Then the aromatic hydrocarbon polymer is added and stirred, and the temperature elevated to 350° F. (177° C.). Some foaming or bubbling may be experienced at this point. Thereafter, the cellulose ether component is added and stirred in.

The finely divided inorganic filler material is now added with stirring while the temperature is held between about 345° to 355° F. (174°–180° C.) for a period of 4 to 5 hours. During the initial portion of the holding period, considerable bubbling has been noted indicative of some chemical reaction occurring. The resultant product, which may be an interpolymer of the organic constituents is stable, thermoplastic and possesses the desired properties for use as an encapsulating compound.

Ingredients other than mentioned above may be present which improve but do not basically alter the properties of the principal ingredients, e.g. bodying agents, plasticizers, etc.

To summarize, the encapsulating compositions of the present invention have the following composition:

| Organic Moiety | Parts by Weight |
|---|---|
| Dimeric unsaturated fatty acid | 5–20 |
| Aliphatic hydrocarbon polymer | 10–20 |
| Aromatic hydrocarbon polymer | 10–20 |
| Fatty acid | 2–5 |
| Alkyl cellulose ether | 2.5–8 |
| Antioxidant | 0.05–0.4 |
| Inorganic Moiety | 100 |

| Thermoplastic Hot Melt Encapsulating Compositions | Parts by Wt/100 parts of composition |
|---|---|
| Organic Moiety | 30–95 |
| Inorganic Moiety | 5–70* |

*But not to exeed CPVC

The following specific examples are illustrative of thermoplastic normally solid hot melt compositions in accordance with the present invention:

EXAMPLE I

The following example is a normally solid thermoplastic hot melt composition which can be used for encapsulating jet engine air foils. This composition has the following formulation:

| Materials | Parts by Weight |
|---|---|
| Dilinoleic acid ("Empol-1022", Emery Co.) | 5.0 |
| Stearic acid | 3.5 |
| $C_5$–$C_6$ hydrocarbon polymer ("Wingtack 95", Goodyear) | 13.9 |
| Aromatic hydrocarbon polymer (Picco 6100, Hercules) | 13.0 |
| Aluminum oxide | 60 |
| 4,4'-methylene bis (2,6-ditert. butylphenol) (antioxident) | 0.1 |
| Ethyl cellulose | 4.5 |

EXAMPLE II

| Materials | Parts by Weight |
|---|---|
| $C_{16}$–$C_{18}$ dimer fatty acids | 7 |
| $C_5$ terpene hydrocarbon polymer ("Wingtack 95") | 10 |
| Aromatic hydrocarbon polymer (Picco 6100) | 10 |
| Ethyl cellulose | 3 |
| Stearic acid | 2 |
| Aluminum oxide (–325mesh) | 68 |

Example II is illustrative of about the maximum amount of aluminum oxide which can be used satisfactorily in the particular resin composition. At over 70% concentration of aluminum oxide, the composition is too weak for satisfactory use as an encapsulating compound. This latter concentration corresponds to a CPVC of about 32%.

EXAMPLE III

| Materials | Parts by Weight |
|---|---|
| $C_{16}$–$C_{18}$ dimer fatty acids | 13 |
| Polyterpene (MW 1100) | 17 |
| Aromatic hydrocarbon polymer (Picco 6100) | 15 |
| Propyl cellulose ether | 8 |
| Palmitic acid | 2 |
| Silica (–325 mesh) | 44.9 |
| Antioxidant | .1 |

This composition is satisfactory as an encapsulating compound is somewhat more expensive than the composition of Example I. The amount of silica is below the CPVC for the system.

EXAMPLE IV

| Materials | Parts by Weight |
|---|---|
| Dilinoleic acid | 5 |
| Aromatic hydrocarbon polymer | 36 |
| Methyl cellulose | 5 |
| Arachidic acid ($C_{20}$) | 2 |
| Titanium dioxide (–325 mesh) | 52 |

Example IV illustrates the use of an aromatic hydrocarbon polymer as the sole hydrocarbon polymer in the composition. The amount of inorganic filler is below the CPVC of the system.

EXAMPLE V

| Materials | Parts by Weight |
|---|---|
| Dilinoleic acid | 7 |
| Mixed Stearic/palmitic acids | 3 |
| Aliphatic hydrocarbon polymer ("Wingtack 95") | 40 |
| Aluminum oxide (–325 mesh) | 35 |
| Iron (–325 mesh) | 7 |
| Ethyl cellulose | 7.9 |
| Antioxident (4,4'-methylene bis (2,6-ditert. butylphenol)) | 0.1 |

Example V illustrates the use of an aliphatic hydrocarbon polymer as the sole hydrocarbon polymer in the composition. The inorganic moiety is a mixture of two inorganic filler materials, a ceramic oxide and a powdered metal. The amount of inorganic filler is below the CPVC for the system.

What is claimed is:

1. A normally solid thermoplastic hot melt composition comprising a dispersion of from 5% to 70% by weight of an inorganic portion which is a finely divided inorganic filler having a particle size such that 95% passes through a 200 mesh standard screen, and from 95% to 30% by weight of an organic portion which is a blend of
    (a) 5 to 20 parts by weight of an aliphatic dicarboxylic acid containing from 32 to 40 carbon atoms;
    (b) from 10 to about 20 parts by weight of a nonpolar $C_5$–$C_6$ alkylene hydrocarbon polymer having a molecular weight in the range of from about 1000 to about 1400 and having a softening point of from about 95° F. to 120° F. measured by the ring and ball method;
    (c) from 10 to 20 parts by weight of a nonpolar, aromatic hydrocarbon polymer having a softening point in the range of from about 98° to 115° C. measured by the ring and ball method and a viscosity at 25° C. as a 70% solution in toluene of R-U Gardner-Holdt;
    (d) from 2.5 to 8 parts by weight of a $C_1$–$C_3$ alkyl cellulose ether;

(e) from 2 to 5 parts by weight of a $C_{10}$-$C_{20}$ monocarboxylic saturated fatty acid, unsaturated monobasic carboxylic acid or mixtures thereof the amount of said inorganic filler on a volume basis being less than the critical pigment volume concentration of the inorganic filler in said organic portion.

2. A composition in accordance with claim 1 wherein the aliphatic dicarboxylic acid is a dimeric fatty acid of an unsaturated monocarboxylic fatty acid containing from 16-20 carbon atoms.

3. A composition in accordance with claim 2 wherein the unsaturated monocarboxylic fatty acid is linoleic acid.

4. A composition in accordance with claim 2 wherein the dimeric fatty acid is dilinoleic acid.

5. A composition in accordance with claim 1 wherein the alkylene hydrocarbon polymer is one having a molecular weight of 1200 and a softening point of about 100° C. as determined by the ring and ball method.

6. A composition in accordance with claim 5 wherein the alkylene hydrocarbon polymer is a polyterpene.

7. A composition in accordance with claim 6 wherein the polyterpene is a polymer of the following mixture of alkylene hydrocarbons:

| | |
|---|---|
| 2 - pentene | 4.8% |
| 2 - methyl - 2 - butene | 42.2% |
| Isoprene | 2.5% |
| 1, 3 - pentadiene | 42.4% |
| 2, 3 - dimethyl - 1 - butene | 2.3% |
| Unsat. $C_5$-$C_6$ hydrocarbons | 5.7% |

8. A composition in accordance with claim 1 wherein the nonpolar aromatic hydrocarbon polymer is one having a softening point in the range of 98–102, an acid number less than b 1 and a saponification value less than 1.

9. A composition in accordance with claim 1 wherein the inorganic filler material is a ceramic oxide.

10. A composition in accordance with claim 9 wherein the ceramic oxide is aluminum oxide.

11. A composition in accordance with claim 9 wherein the aluminum oxide has a particle size such that at least 95% passes through a 325 mesh screen.

12. A composition in accordance with claim 1 wherein the $C_1$-$C_3$ alkyl cellulose ether is ethyl cellulose.

13. A composition in accordance with claim 1 wherein the aliphatic dicarboxylic acid is dilinoleic acid in an amount of from 5 to 10 parts by weight; the $C_5$-$C_6$ alkylene hydrocarbon polymer is a polymer of the following mixture of alkylene hydrocarbons:

| | |
|---|---|
| 2-pentene | 4.8% |
| 2-methyl-2-butene | 42.2% |
| Isoprene | 2.5% |
| 1, 3-nentadiene | 42.4% |
| 2,3-dimethyl-1-butene | 2.3% | having a molecular weight of 1200 and present in an amount of from 12 to 14 parts by weight; the nonpolar aromatic hydrocarbon polymer has a softening point in the range of 98–102, an acid number less than 1, and a saponification number less than 1 and is present in an amount of about 13 parts by weight; the alkyl cellulose ether is ethyl cellulose and is present in an amount of about 4.5 parts by weight and from 60% to 68% by weight of powdered aluminum oxide having a particle size such that at least 95% passes through a 325 mesh screen.

* * * * *

UNITED STATES PATENT OFFICE
CERTIFICATE OF CORRECTION

Patent No. 4,132,685　　　　　　　　　Dated　January 2, 1979

Inventor(s)　Fred B. Speyer

It is certified that error appears in the above-identified patent and that said Letters Patent are hereby corrected as shown below:

Column 10, line 1, delete "b".

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*